United States Patent
Yoshikawa et al.

(10) Patent No.: US 7,403,335 B2
(45) Date of Patent: Jul. 22, 2008

(54) SCREEN, FRESNEL LENS SHEET USED FOR THE SAME, AND IMAGE DISPLAY APPARATUS USING THE SAME

(75) Inventors: Hiroki Yoshikawa, Hiratsuka (JP);
Tetsu Ohishi, Hiratsuka (JP); Koji Hirata, Yokohama (JP); Daisuke Imafuku, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 175 days.

(21) Appl. No.: 11/011,188

(22) Filed: Dec. 15, 2004

(65) Prior Publication Data

US 2005/0270643 A1 Dec. 8, 2005

(30) Foreign Application Priority Data

Jun. 4, 2004 (JP) ............................ 2004-166549

(51) Int. Cl.
*G03B 21/60* (2006.01)
*G03B 21/00* (2006.01)
*G03B 21/26* (2006.01)
*G03B 21/14* (2006.01)
*G03B 21/28* (2006.01)

(52) U.S. Cl. .................... 359/457; 359/454; 353/33; 353/34; 353/38; 353/81

(58) Field of Classification Search ................ 359/445, 359/456–57, 442, 831; 353/30, 33, 34, 38, 353/81
See application file for complete search history.

(56) References Cited

U.S. PATENT DOCUMENTS 6,292,295 B1 * 9/2001 Yamashita et al. .......... 359/460
6,804,055 B2 * 10/2004 Peterson et al. ............. 359/457

FOREIGN PATENT DOCUMENTS

WO     WO 02/27399 A1     4/2002

\* cited by examiner

*Primary Examiner*—Diane I. Lee
*Assistant Examiner*—Magda Cruz
(74) *Attorney, Agent, or Firm*—Antonelli, Terry, Stout & Kraus, LLP.

(57) ABSTRACT

The present invention provides a screen suitable for reducing the longitudinal dimension of a set. The present invention includes two prism sections. One is a totally reflective prism section (10) provided at the image generation source side of a Fresnel lens sheet (6). The other is a refractive prism section (11) provided at the image-watching side of the Fresnel lens sheet. The refractive prism section (11) includes a refractive face (e) for refracting incident light and making the light exit toward the image-watching side, a plane (f) approximately parallel to the principal plane of the Fresnel lens sheet, and a connection face (g) for continuously forming the face (e) and the plane (f).

14 Claims, 8 Drawing Sheets

SCREEN, FRESNEL LENS SHEET USED FOR THE SAME, AND IMAGE DISPLAY APPARATUS USING THE SAME

CLAIM OF PRIORITY

The present application claims priority from Japanese application serial no. JP2004-166549, filed on Jun. 4, 2004, the content of which is hereby incorporated by reference into this application.

BACKGROUND OF THE INVENTION (1) Field of the Invention

The present invention relates to an image display apparatus for enlarging the image generated by an image generation source, and displaying the image in a projection format on a transmissive screen. The invention also relates to the screen and Fresnel lens sheet used for the image display apparatus.

(2) Description of the Related Art

A projection type of image display apparatus (hereinafter, called the set in some cases) projects, in enlarged form onto a transmissive screen via a projection lens and/or the like, the image displayed by the projection cathode-ray tube or liquid-crystal display apparatus (or the like) that functions as a compact image generation source, and thus forms that image on the transmissive screen.

Such a type of set is required to be thinned down (longitudinally downsized) to reduce weight, costs, and an installation space requirement. Known configurations of transmissive screens for use with a thinned-down set include the configuration described in, for example, WO/02/27399 (hereinafter, referred to as Patent Document 1).

SUMMARY OF THE INVENTION

The thinning-down (longitudinal downsizing) of the set can be achieved by reducing the projection distance by use of a wider-angle projection-lens and further shifting the optical-axis center of the projection lens downward with respect to the center of the transmissive screen (e.g., aligning the optical-axis center of the projection lens with the central lower end of the transmissive screen).

Figure 10:
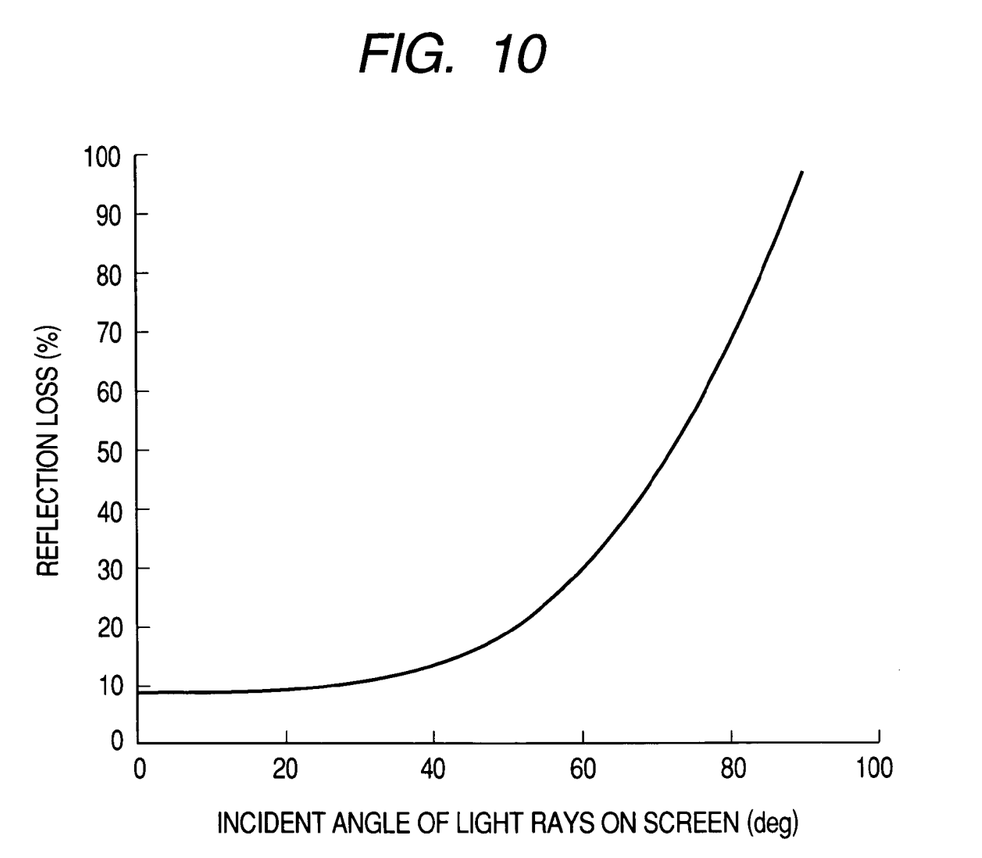
FIG. 10 is a diagram representing the relationship between the incident angle of light rays on the screen of an exit-face Fresnel lens, and reflection loss.

In such a configuration, however, for example, if the size of the screen (16:9 in terms of aspect ratio), the projection distance of the projection lens, and the depth of the set are set to 65 inch diagonal, 500 mm, and 350 mm, respectively, the incident angle of the image light entering the upper left and right ends of the transmissive screen from the projection lens increases to 65.2 degrees. FIG. 10 is a diagram representing the relationship between the incident angle of light rays on the screen in a general exit-surface Fresnel lens, and reflection loss. It can be seen from FIG. 10 that for a light-ray incident angle of 65.2 degrees, the reflection loss of the screen increases to as much as 36%. Further thinning-down of the set abruptly increases the loss and the upper left and right ends of the screen decrease in brightness.

Patent Document 1 discloses a transmissive screen that responds to such thinning-down of the set by providing refractive prisms and totally reflective prisms alternately on the light entrance surface of a Fresnel lens sheet, and making the exit surface of light into a plane. In the configuration described in Patent Document 1, however, since the configuration has refractive prisms on the light entrance surface of the Fresnel lens sheet, efficiency decreases and particularly a medium-band image (on the screen, a donut-like range) important for obtaining high image quality becomes dark.

Also, in the configuration having a refractive prism and a totally reflective prism on the Fresnel lens sheet, the discontinuity of light may occur at the interface between the refractive prism and the totally reflective prism. If the discontinuity of light actually occurs, the image when viewed from the front will include discontinuous sections and image quality will deteriorate.

Accordingly, for a transmissive screen responding to the thinning-down of the set, it is important to reduce the reflection loss of light on the entrance plane of the screen and to improve utilization efficiency of the light and make the image brighter (i.e., suppressing decreases in the brightness of the image). It is also important to suppress the discontinuity of the light.

The present invention has been made in consideration of the above situation, and the invention provides a technology suitable for reducing the depth (longitudinal dimension) of an image display apparatus while at the same time obtaining high-quality images.

In the present invention, a plurality of totally reflective (entrance-side) prisms are formed in the region where light is to enter at a desired incident angle (e.g., approximately 40 degrees) or greater, at the image generation source side (on the entrance face of light) of a Fresnel lens sheet, and a plurality of refractive (exit-side) prisms are formed at the image-watching side (on the exit face of the light). The foregoing totally reflective prisms each include an entrance face at which the light comes in, and a totally reflective face on which the incident light from the entrance face is reflected and from which the light exits toward the image-watching side. Also, the foregoing reflective prisms are each formed in a range including a region of an opposite face with respect to the region at the image generation source side of the Fresnel lens sheet where the totally reflective prisms are not formed, and include a refractive face on which the foregoing light is refracted and from which the light exits toward the image-watching side. In addition, in the present invention, a face approximately parallel to the principal plane of the Fresnel lens sheet is formed on at least one of the plural refractive prisms.

That is to say, the refractive prisms each include: a first face (refractive face) that inclines to the central side of the Fresnel lens sheet with respect to a line orthogonal to the principal plane thereof, and makes the light exit toward the image-watching side by refracting the light; a second face (plane) approximately parallel to the principal plane of the Fresnel lens sheet positioned at the end of the corresponding exit-side prism that faces the light-exit side; and a third face approximately perpendicular to the principal plane of the Fresnel lens sheet.

At least one of the plural exit-side prisms may also be provided at a position on a face opposite to that of the totally reflective prisms, and each of the refractive prisms provided at positions on the face opposite to each such entrance-side prism may also include the foregoing first, second, and third faces. In addition, the third face may be a rough face.

Furthermore, the height of the valley of each totally reflective prism and the height of a section at which the totally reflective prisms are not formed may be made approximately equal to each other, and the height of the valley of each refractive prism and the height of a section at which the refractive prisms are not formed may be made approximately equal to each other.

Besides, a diffusing material may be contained in the ultraviolet-cured-type resin used to form the refractive prisms, and/or in the ultraviolet-cured-type resin used to form the totally reflective prisms.

According to the present invention, it becomes possible to thin down an image display apparatus while at the same time obtaining high image quality.

DETAILED DESCRIPTION OF THE PREFERRED EMBODIMENTS

Embodiments of the present invention are described below referring to the accompanying drawings.

(1) First Embodiment

Figure 1:
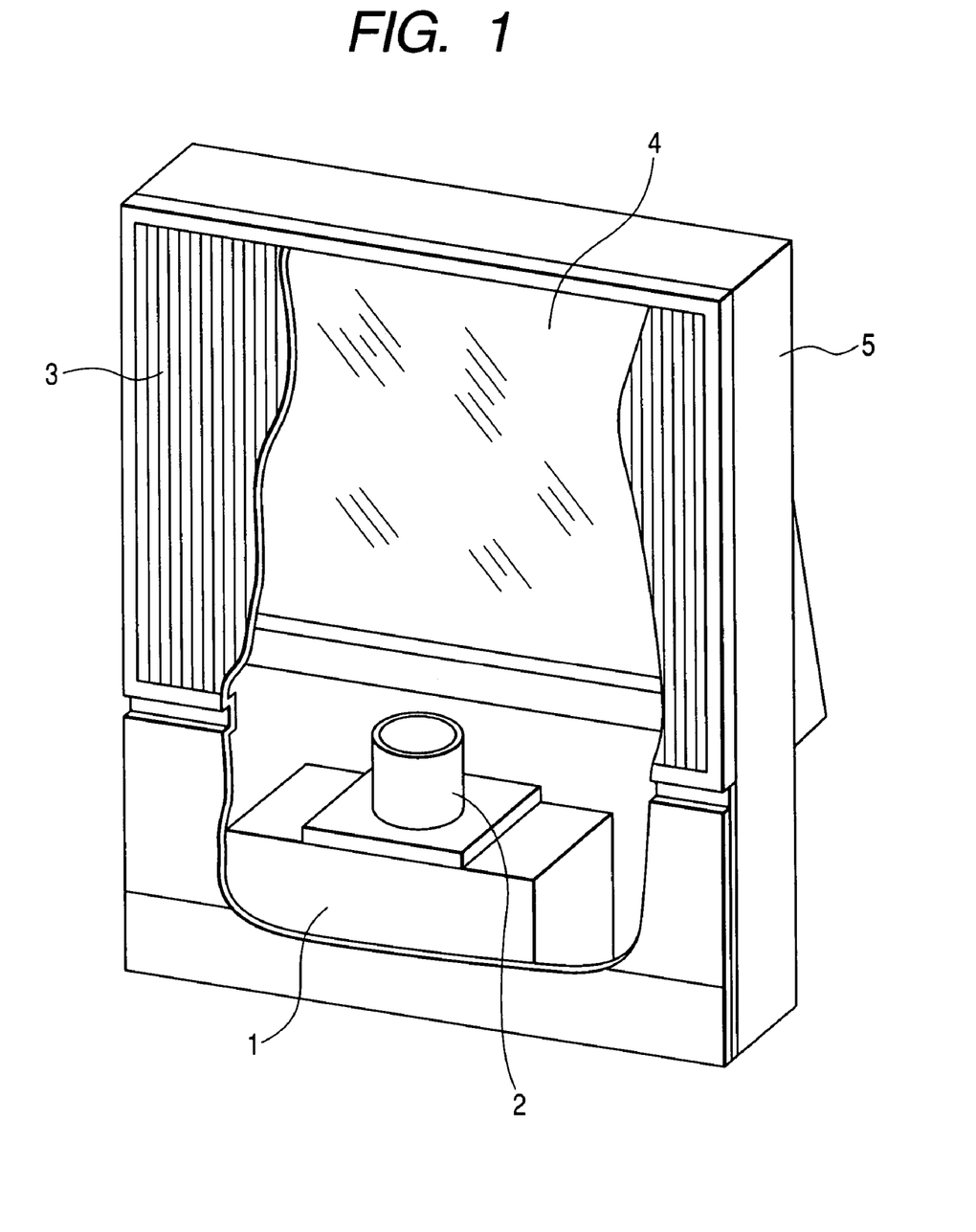
FIG. 1 is a partially sectional, perspective view showing an example of an image display apparatus to which the present invention is applied.

FIG. 1 is a partially sectional, perspective view showing an example of an image display apparatus according to the present invention. An image generation source 1 includes a projection cathode-ray tube or a reflective or transmissive liquid-crystal panel, an image modulation element such as a display element having a plurality of very small mirrors, and other elements, and displays an image. Although a projection lens 2 projects the image onto a transmissive screen 3, since the projection lens is generally long in projection distance, a reflecting mirror 4 is provided halfway on an optical path thereof to reduce the depth (longitudinal dimension) of the image display apparatus. These elements are fixed to a desired position inside a frame 5.

Figure 2:
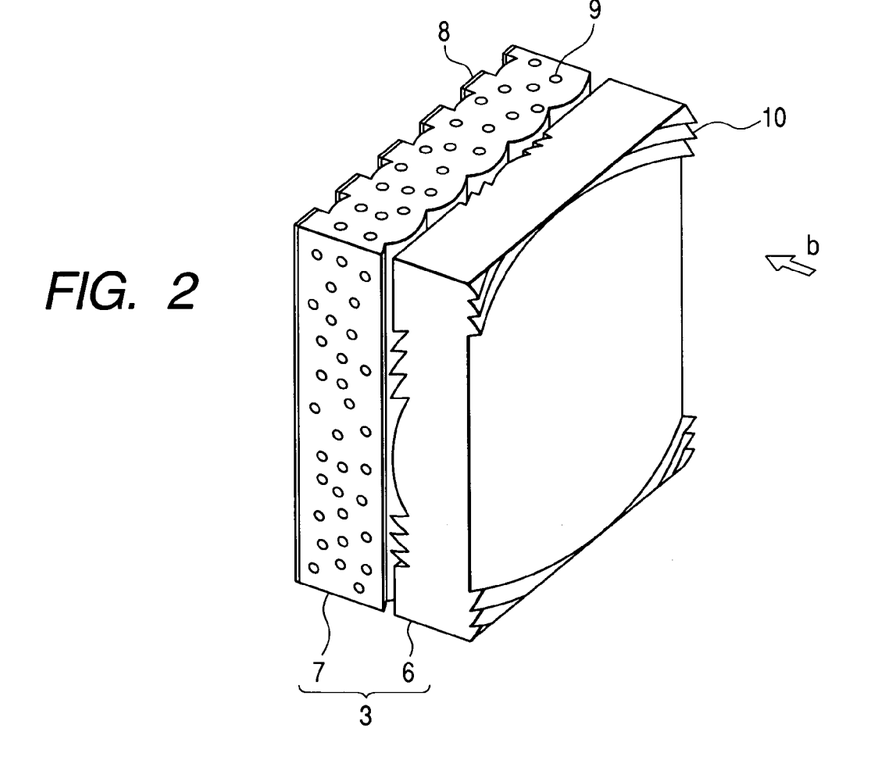
FIG. 2 is a schematic view showing the structure of the transmissive screen 3 of the image display unit shown in FIG. 1.

FIG. 2 is a schematic view showing a structure of a transmissive screen 3 according to the present invention. The enlarged image (not shown) projected from a direction of an arrow "b" is converted, at a Fresnel lens sheet 6, into approximately parallel light or the light directed slightly inward, and the image light enters a lenticular lens sheet 7. The lenticular lens sheet 7, as shown, has such a shape that a plurality of lenticular lenses taking a vertical direction of the screen as their longitudinal direction are arrayed in a horizontal direction of the screen, and diffuses the image light in the horizontal direction of the screen. Also, black stripes 8 extending vertically on the screen are formed on an exit face of the lenticular lens sheet 7, thus absorbing the external light incident from the exit side of the screen. In addition, the lenticular lens sheet 7 contains a diffusing material 9, which functions to diffuse the image light in the horizontal and vertical directions of the screen. The transmissive screen of FIG. 2 according to the present invention has the following configurational features: (1) a plurality of totally reflective (entrance-side) prisms 10 each constructed of the total reflective face that gives a desired entrance-face exit angle to incident rays by generating a total-reflection phenomenon following completion of a first refraction phenomenon are provided at the image generation source side of the Fresnel lens sheet, in the range where an incident angle of the enlarged image projected from the direction of the arrow "b", on the Fresnel lens sheet, becomes at least approximately 40 degrees or more; and (2) a refractive (exit-side) prism that includes a refractive face for making the incident rays exit as exit rays of a desired exit angle by means of a second refraction phenomenon is provided at the image-watching side of the Fresnel lens sheet, in the range that includes a region opposed to a region not having the totally reflective prisms.

Figure 3:
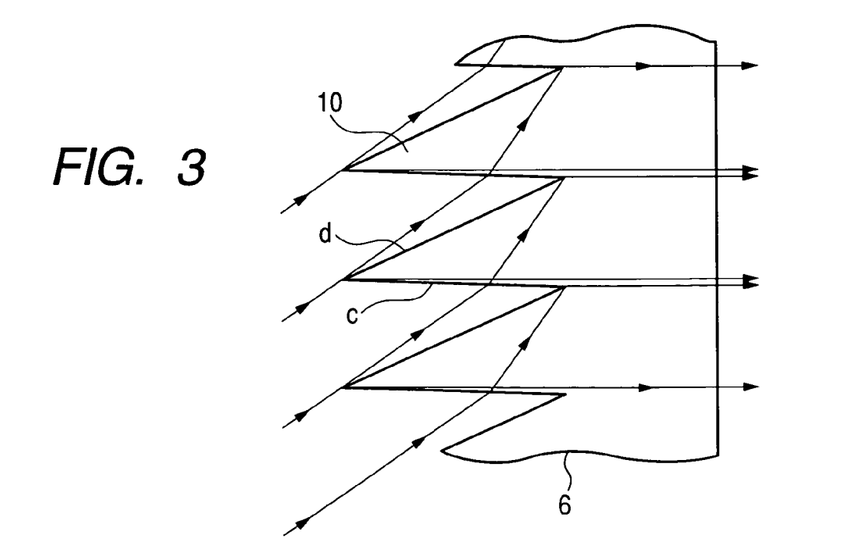
FIG. 3 is a longitudinal sectional view of the total-reflection section of a Fresnel lens sheet 6 according to the present invention shown in FIG. 2.

Operation of the totally reflective prisms 10 is described below using FIG. 3. FIG. 3 is a longitudinal sectional view of the Fresnel lens sheet 6 according to the present invention shown in FIG. 2, and positionally shows the neighborhood of an upper left (right) end of the transmissive screen 3 of FIG. 1. The arrow shown in FIG. 3 indicates a direction of rays. As shown in FIG. 3, the totally reflective prisms 10 are provided at the image source side of the Fresnel lens sheet 6, and a plane is formed at the watching side. Incident rays from the image source side enter from a face "c" (entrance face) of each of the totally reflective prisms 10, and after being totally reflected on a face "d" (totally reflective face), exit almost horizontally toward the watching side. FIG. 3 is a longitudinal sectional view of the section where the watching side is formed into a flat plate shape, and a refractive prism is provided in a range opposed to a section not having the totally reflective prisms. The reason for this is that the totally reflective prisms 10 cannot be provided if the incident angle of the enlarged image projected from the optics at the image generation source side, on the Fresnel lens sheet 6, is too small. Therefore, in the range where the incident angle of the projected image on the Fresnel lens sheet 6 is small, a plane is to be provided at the image source side, and a refractive prism 11 at the watching side, to construct a normal exit-face Fresnel lens. An interface between both is formed so that exit rays from the totally reflective prisms overlap by at least one pitch or more of the refractive prism 11. The reason for this is described below using FIG. 4.

Figure 4:
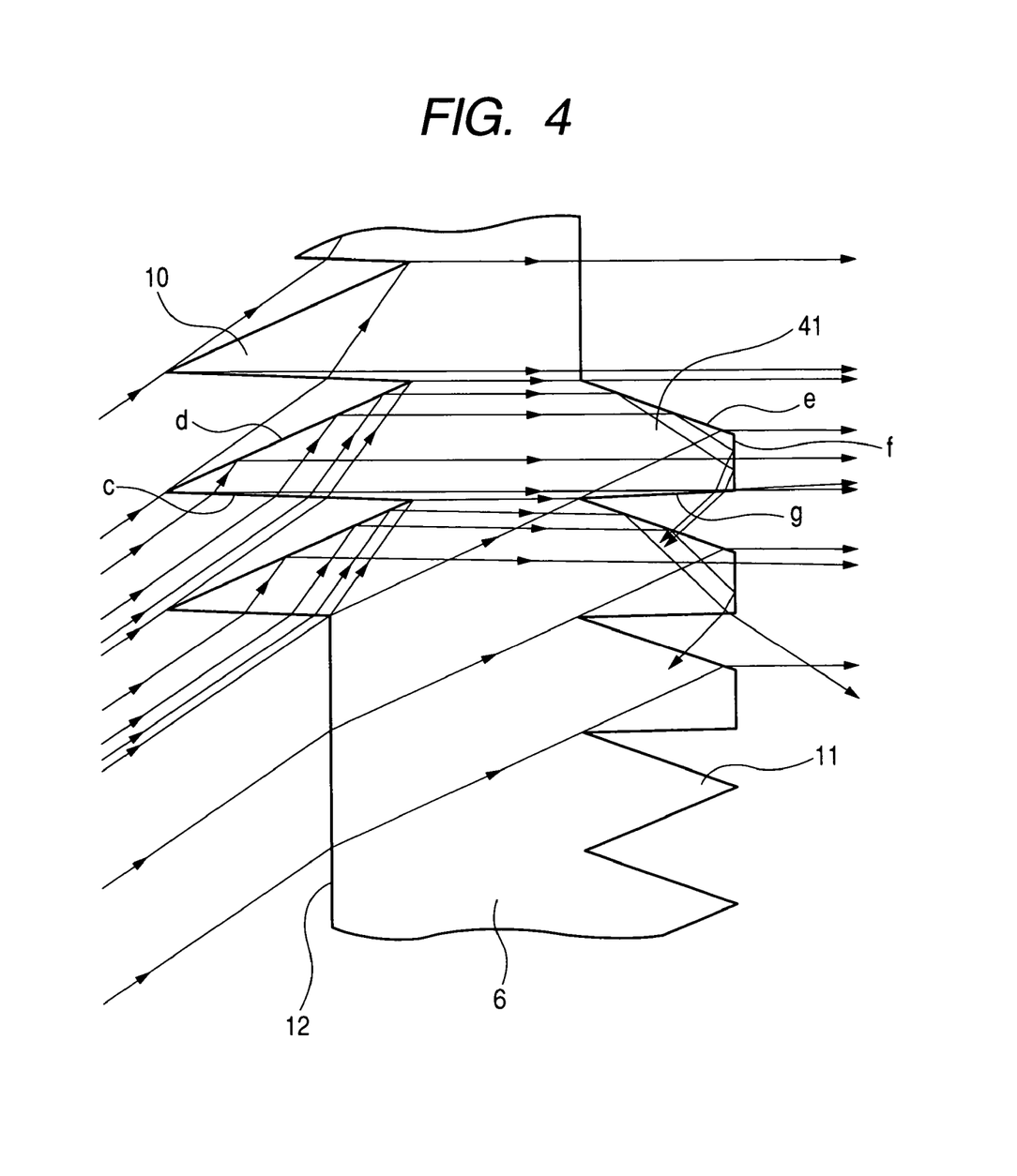
FIG. 4 is a longitudinal sectional view of a Fresnel lens sheet 6 according to a first embodiment of the present invention.

FIG. 4 is a longitudinal sectional view of the Fresnel lens sheet 6 according to the first embodiment of the present invention, and shows in enlarged form the interface between the totally reflective prisms 10 and a planar section 12. As shown in FIG. 4, the desired region at the image source side of the Fresnel lens sheet 6 (i.e., the region where the image light enters at a desired incident angle of 40 degrees or less) forms the planar section 12, a flat section not having the totally reflective prisms 10. The totally reflective prisms 10 cannot be provided if the incident angle of the image projected from the optics at the image generation source side, on the Fresnel lens sheet 6, is too small. Therefore, in the range where the incident angle of the projected image on the Fresnel lens sheet 6 is small, the plane is to be provided at the image source side, and the refractive prism 11 at the watching side, to construct the normal exit-face Fresnel lens. As can be seen from these, in the Fresnel lens sheet 6 according to the present embodiment, the image source side is to suddenly change from the flat section to the section having the totally reflective prisms 10. Since the image source side and watching side of the Fresnel lens sheet 6 are molded using independent metallic molds, it is difficult to match both sides in position. Expansion/contraction due to differences in temperature also makes it difficult to match both sides completely. Accordingly, the need arises to take a preventing measure that does not affect the image even when the above-mentioned image source side changes from the flat section to the section having the totally reflective prisms 10. For the Fresnel lens sheet 6 of FIG. 4 in the first embodiment, the totally reflective prism section and the refractive prism section are formed so as to overlap by at least one pitch or more in a direction orthogonal to a principal plane of the screen. More specifically, in the present embodiment, the refractive prism is also provided at sections other than the region opposed to the planar section 12 at the image-watching side of the Fresnel lens sheet 6, and at least one of these refractive prisms is provided at a position on a face opposite to that of the totally reflective prisms. Hereinafter, each of the refractive prisms disposed on the face opposite to that of the totally reflective prisms is simply called the "particular prism" and denoted as reference number 41. The rays that have exited the totally reflective prisms 10, and the rays that have entered the planar section 12 enter the particular prism 41.

In the present embodiment, the particular prism 41 has a shape including a first face (hereinafter, called the refractive face) "e", a second face (plane) "f", and a third face (connection face) "g". The refractive face "e" is inclined toward the center of the Fresnel lens sheet 6 with respect to a line (optical axis) orthogonal to a principal plane thereof, refracts incident light, and makes the light exit toward the image-watching side. The plane "f" is positioned at the end of the particular prism 41 that faces the light-exit side, and is approximately parallel to the principal plane of the Fresnel lens sheet 6. The connection face "g" is a face necessary to form the refractive face "e" and the plane "f" continuously, and is approximately vertical to the principal plane of the Fresnel lens sheet 6.

The light, after entering from the "c" face of the totally reflective prism 10 and totally reflecting on the "d" face, exits intact if the watching side of the Fresnel lens sheet 6 is flat. When the light enters the refractive face "e" of the particular prism 41, part of the light, as shown, totally reflects on the refractive face "e" and the plane "f" and returns to the refractive prism to become stray light, part of which then exits downward. The light that has entered the plane "f" of the particular prism 41 exits intact as image light. The connection face "g" of the refractive prism 41 is almost vertical, so that almost no light enters. A slight amount of incident light totally reflects on the connection face "g" and exits from the plane "f" as image light. As described above, according to the present embodiment, when the rays that have exited the totally reflective prism 10 enter the particular prism 41, most of the light exits as image light, and part of the light returns to the particular prism 41 to become stray light, part of which then further exits downward.

According to such optical operation, the particular prism 41, compared with a prism of a normal shape not having the plane "f", can suppress the occurrence of the concentric image-missing portion appearing when the screen is viewed from the image-watching side, and the occurrence of the luminescent lines appearing at the top and bottom of the concentric image-missing portion.

By the way, the present applicant earlier filed Patent Application No. 2003-322430 (hereinafter, this Application is called the prior application). In the prior application, the present applicant proposed forming a totally reflective prism including a totally reflective face, in the region where light is to enter at a desired incident angle or greater, at the image generation source side of a Fresnel lens sheet, and forming a refractive prism in a range which includes a region of an opposite face with respect to a region not having a totally reflective prism. According to the corresponding configuration described in the prior application, a screen capable of displaying high-quality images almost free from loss of light can be provided, even for a thinned-down set. Since the refractive prism (positioned facing the totally reflective prism) disclosed in the prior application has, as shown in FIG. 2 thereof, a shape not having the plane "f", light that has entered the refractive prism from the totally reflective prism is diverged upward and downward. For this reason, in the prior application, although the loss of the light is reduced, such concentric image-missing portion, and luminescent lines appearing at the top and bottom thereof, that are mentioned above, are likely to occur. In the present invention, however, since the plane "f" is formed on the particular prism 41, a large part of the light incident on the particular prism 41 passes through the plane "f" and travels straight toward the image-watching side. The occurrence of the foregoing concentric image-missing portion can therefore be suppressed. Also, since the light that has been totally reflected by the refractive face "e" is further totally reflected by the plane "f" and returns to the refractive prism to become stray light, it is possible to suppress the occurrence of the luminescent lines appearing near the concentric image-missing portion. In short, according to the present embodiment, it is possible to obtain image quality higher than that obtainable according to the prior application.

Additionally, at the interface between the totally reflective prism 10 and the planar section, light incident on the planar section 12 and light incident on a starting section of the totally reflective prism 10 exit together, which results in part of the image becoming missing. However, the face at the image generation source side of the Fresnel lens sheet 6 and the face at the image-watching side deviate from each other, and thus the image defect of image light being lost and a black arc appearing does not occur. Furthermore, even when part of the image is lost, the amount of loss is only equivalent to the amount of deviation between both faces. Since the screen is originally manufactured with high accuracy, the above deviation is not too significant and thus the missing portion is not conspicuously large.

Besides, a large part of the rays incident on the particular prism 41 pass through the plane "f". All refractive prisms provided at the image-watching side of the Fresnel lens sheet 6 may be constructed of at least three faces (the refractive face "e", the plane "f", and the connection face "g"), as with the particular prism 41.

(2) Second Embodiment

Figure 5:
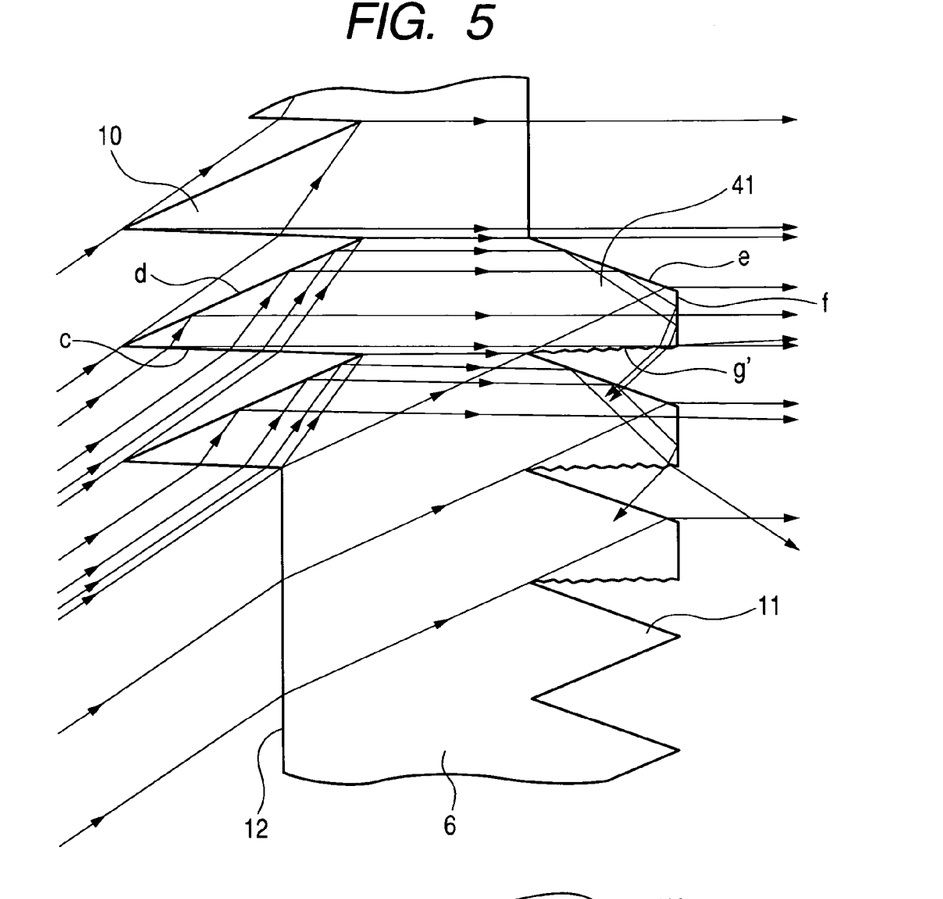
FIG. 5 is a longitudinal sectional view of a Fresnel lens sheet 6 according to a second embodiment of the present invention.
Figure 6:
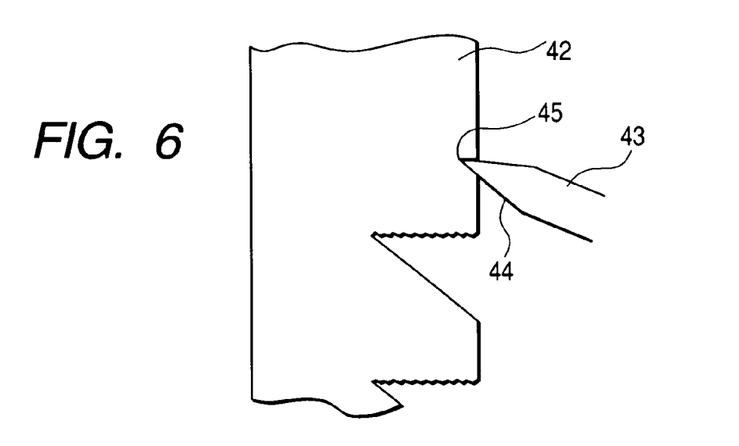
FIG. 6 is a view showing a method of roughing the connection face (g) of a refractive prism in the second embodiment of the present invention.

FIG. 5 is a longitudinal sectional view of a second embodiment of the Fresnel lens sheet 6 according to the present invention, and shows in enlarged form the interface between the totally reflective prisms 10 and the planar section 12. In FIG. 5, the same reference numbers as in FIG. 4 denote the same components. FIG. 5 differs from FIG. 4 in that the connection face "g'" is a rough face. It has been described in the first embodiment that when exit rays from a totally reflective prism 10 enter an associated refractive prism 41, most of the light exits as image light, and part of the light returns to that refractive prism 41 to become stray light, part of which then further exits downward. The amount of downward exiting light of all exit light mentioned above is almost unnoticeably slight. On closer observation, however, one will notice the downward exiting light appear as a thin concentric white line. In the second embodiment of the present invention, even this slight amount of light can be made invisible. That is to say, in the present embodiment, the connection face "g'" through which the slight light passes is roughed to scatter the light and thus make it invisible. FIG. 6 is a view showing an example of a technology for roughing the connection face "g'". A cutting face 44 of a cutting tool 43 preadjusted to an angle of a refractive face "e" of a Fresnel lens is fed in at the same angle as that of a connection face "g'" of the Fresnel lens. Thus, a face associated with the connection face "g'" of the Fresnel lens can be flawed with a tool tip 45 of the cutting tool 43. Creating a resin mold from mold-use UV (ultraviolet) resin by use of a thus-produced metallic mold 42 and then molding a Fresnel lens in the resin mold makes it possible to form the Fresnel lens with a rough connection face "g'".

(3) Third Embodiment

Figure 7:
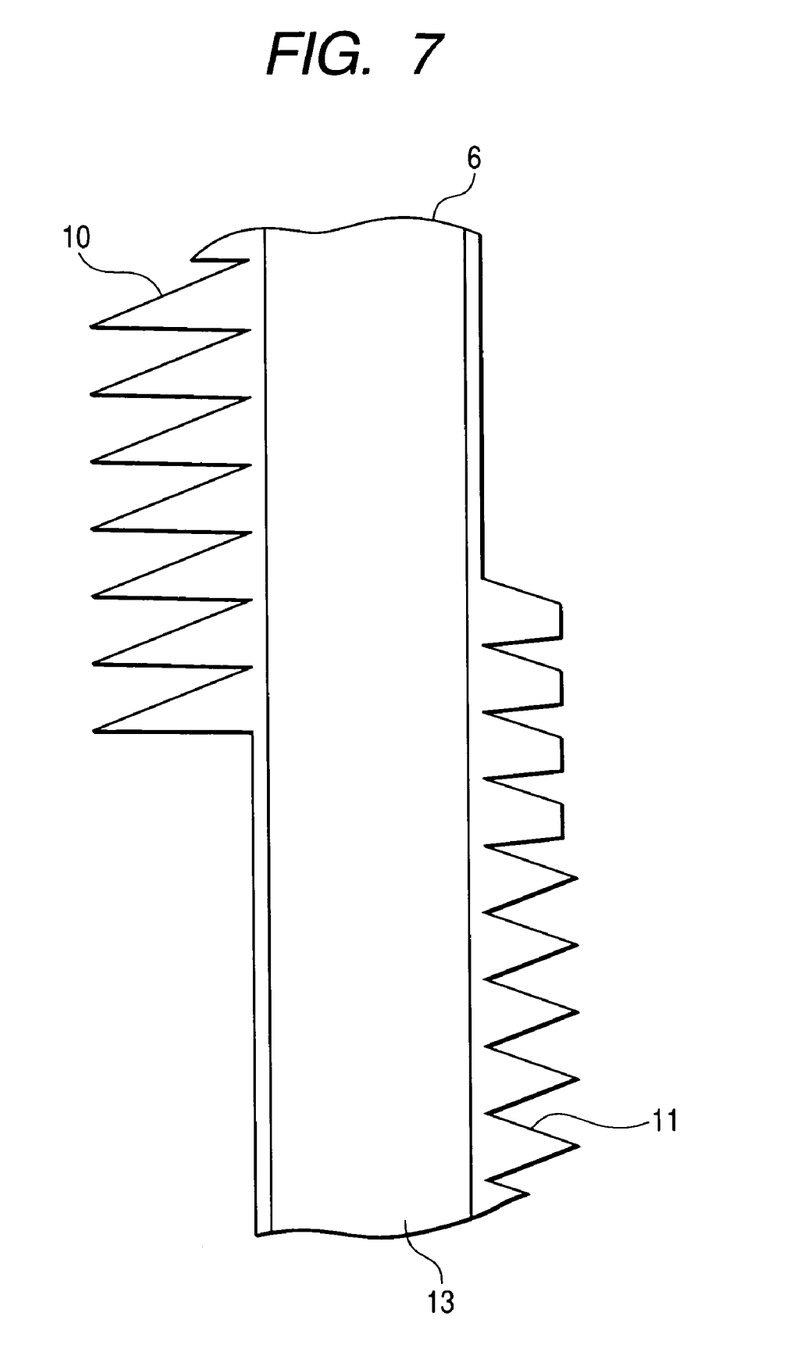
FIG. 7 is a longitudinal sectional view of a Fresnel lens sheet 6 according to a third embodiment of the present invention.

Next, a third embodiment of the present invention is described below using FIG. 7. In the present embodiment, a totally reflective prism section and a refractive prism section are molded using ultraviolet-cured-type resin. FIG. 7 is a longitudinal sectional view of a Fresnel lens sheet 6 according to the third embodiment of the present invention. On a transparent base material 13 constituting the Fresnel lens sheet 6, totally-reflective prisms 10 and refractive prisms 11 are formed using ultraviolet-cured-type resin. A thickness of an ultraviolet-cured-type resin layer on which neither the prisms 10 nor the prisms 11 are formed is approximately equal to a height of a valley of each such prism. In the present embodiment, it is possible to save the quantity of ultraviolet-cured-type resin, compared with that required when the thickness of the ultraviolet-cured-type resin layer on which neither the prisms 10 nor the prisms 11 are formed is to be made approximately equal to a height of a crest of each such prism. The Fresnel lens sheet 6 can thus be reduced in weight.

(4) Fourth Embodiment

Figure 8:
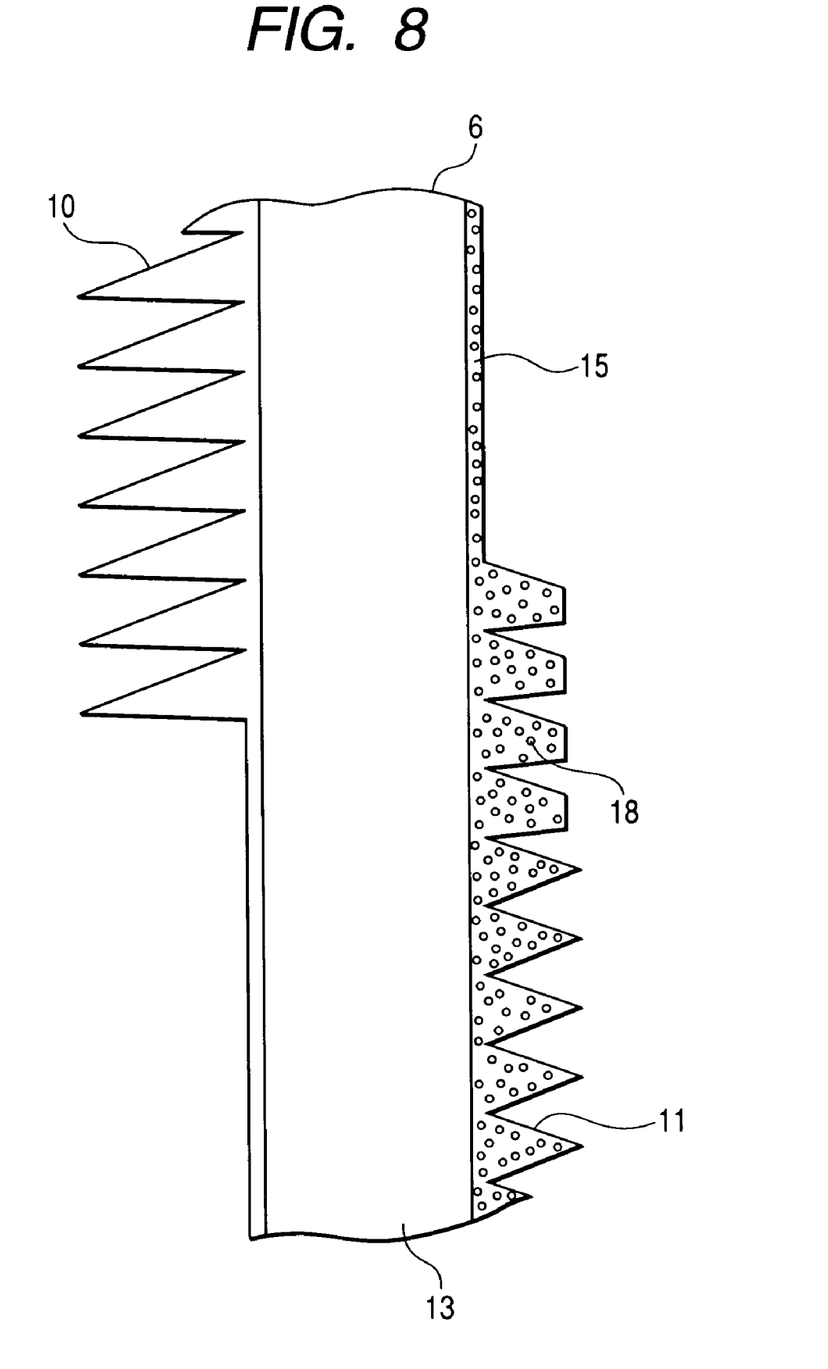
FIG. 8 is a longitudinal sectional view of a Fresnel lens sheet 6 according to a fourth embodiment of the present invention.

Next, a fourth embodiment of the present invention is described below using FIG. 8. FIG. 8 is a longitudinal sectional view of a Fresnel lens sheet 6 according to the fourth embodiment of the present invention. Similarly to the third embodiment, a totally reflective prism section and a refractive prism section are molded using ultraviolet-cured-type resin, and the same reference numbers as in FIG. 7 denote the same components. FIG. 8 differs from FIG. 7 in that a diffusing material 18 is contained in refractive prisms 11. Since the diffusing material 18 is mixed with the ultraviolet-cured-type resin, the diffusing material also enters a second ultraviolet-cured-type resin layer 15 on which the refractive prisms 11 are not formed. The entry, however, does not cause too significant effects since the second resin layer 15 is thin and since rays pass vertically. When the diffusing material 18 is contained in the refractive prisms 11, this improves an amount-of-light distribution of the spot light exiting after it has entered the refractive prism section of the Fresnel lens sheet 6. However, since use of the diffusing material reduces the quantity of light fluxes in terms of peak value, opposed sections of the totally reflective prisms 10 of the Fresnel lens sheet 6 and associated, opposed sections of the refractive prisms 11 need to be moved in the direction where an incident angle of rays becomes smaller for reduced reflection loss at the refractive prism section.

(5) Fifth Embodiment

Figure 9:
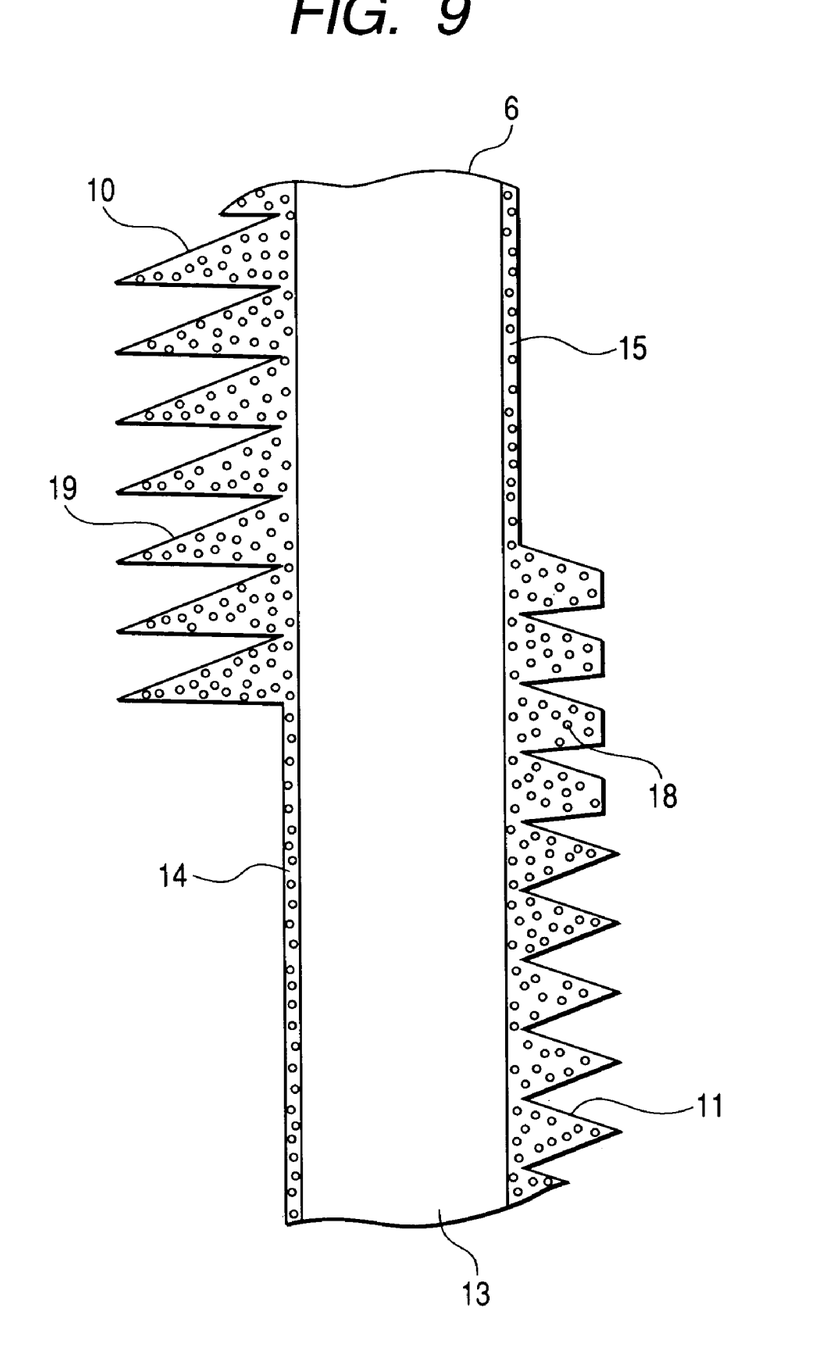
FIG. 9 is a longitudinal sectional view of a Fresnel lens sheet 6 according to a fifth embodiment of the present invention.

Next, a fifth embodiment of the present invention is described below using FIG. 9. FIG. 9 is a longitudinal sectional view of a Fresnel lens sheet 6 according to the fifth embodiment of the present invention. The same reference numbers as in FIG. 8 denote the same components. FIG. 9 differs from FIG. 8 in that a diffusing material 19 is contained in not only refractive prisms 11 but also totally reflective prisms 10. Since the diffusing material 19 is mixed with ultraviolet-cured-type resin, the diffusing material also enters a first ultraviolet-cured-type resin layer 14 on which the totally reflective prisms 10 are not formed. The entry, however, does not cause too significant effects since the first resin layer 14 is thin and since rays pass vertically. Since the diffusing material 19 is contained in not only the refractive prisms 11 but also the totally reflective prisms 10, an amount-of-light distribution of exit light can be brought into an even better agreement between the refractive prisms and the totally reflective prisms. Excessive use of the diffusing material, however, is not permitted since excessive flare occurs and since a peak quantity of light fluxes decreases. In addition, since the totally reflective prisms 10 are originally liable to generate flare, it is preferable that a diffusion effect of the diffusing material 19 contained in the totally reflective prisms 10 should be set to a level lower than that of a diffusion effect of the diffusing material 18 contained in the refractive prisms 11. It goes without saying, however, that use of the same diffusing material for both types of prisms does not affect the essence of the present invention.

Furthermore, in the above embodiments, both the totally reflective prisms and the refractive prisms other than the particular prisms 41, each have a sharp front end. However, the front ends of the totally reflective prisms and/or of the refractive prisms may be rounded (i.e., curved) for the sake of convenience in molding and to suppress the occurrence of discontinuous portions of light.

What is claimed is:

1. A screen onto which light is projected from an image generation source, said screen comprising:
   a Fresnel lens sheet including a plurality of entrance-side prisms each formed at the image generation source side, and a plurality of exit-side prisms each formed at the image-watching side; and
   a diffusing sheet disposed at the image-watching side of said Fresnel lens sheet, said diffusing sheet diffusing image light at least in a horizontal direction of said screen;
   wherein:
   said plurality of entrance-side prisms are each formed in the region where the light enters at an angle equal to or greater than a desired incident angle, at the image generation source side of said Fresnel lens sheet, and include an incident face at which the light enters, and a reflective face that reflects the light entering from the incident face and makes the light exit toward the image-watching side;
   said plurality of exit-side prisms are each formed in the range including a region of an opposite face with respect to a region in which said plurality of entrance-side prisms are not formed, at the image-watching side of said Fresnel lens sheet; and at least one of said plurality of exit-side prisms includes a first face inclining toward a central side of said Fresnel lens sheet with respect to a line orthogonal to a principal plane thereof, refracting the light and making it exit toward the image-watching side, a second face approximately parallel to the principal plane of said Fresnel lens sheet, and a third face approximately vertical to the principal plane of said Fresnel lens sheet, said second face being formed at an end of the image-watching side of said at least one of said plural exit-side prisms.

2. The screen according to claim 1, wherein: at least one of said plurality of exit-side prisms is also provided at a position on an opposite face with respect to said entrance-side prisms; and the exit-side prism on the opposite face with respect to said entrance-side prisms includes the first, second, and third faces.

3. The screen according to claim 1, wherein the third face is a rough face.

4. The screen according to claim 1, wherein said entrance-side prism is formed in the region where an incident angle of light with respect to said Fresnel lens sheet is equal to or greater than 40 degrees.

5. An image display apparatus, comprising:
an image generation source;
optics for projecting in an enlarged form the image generated by said image generation source; and
a transmissive screen for displaying the image projected from said optics;
wherein:
said transmissive screen includes a Fresnel lens sheet disposed at the image generation source side, and a diffusing sheet disposed at the image-watching side in order to diffuse image light at least in a horizontal direction of said screen;
the Fresnel lens sheet has a plurality of entrance-side prisms formed at the image generation source side, and a plurality of exit-side prisms formed at the image-watching side;
the plurality of entrance-side prisms are each formed in the region where the light enters at an angle equal to or greater than a desired incident angle, at the image generation source side of the Fresnel lens sheet, and include an incident face at which the light enters, and a reflective face that refracts the light entering from the incident face and makes the light exit toward the image-watching side;
the plurality of exit-side prisms are each formed in the range including a region of an opposite face with respect to a region in which said plurality of entrance-side prisms are not formed, at the image-watching side of the Fresnel lens sheet; and
at least one of said plurality of exit-side prisms includes a first face inclining toward a central side of said Fresnel lens sheet with respect to a line orthogonal to a principal plane thereof, refracting the light and making it exit toward the image-watching side, a second face approximately parallel to the principal plane of said Fresnel lens sheet, and a third face approximately vertical to the principal plane of said Fresnel lens sheet, said second face being formed at an end of the image-watching side of said at least one of said plural out-side prisms.

6. The image display apparatus according to claim 5, wherein: at least one of the plurality of exit-side prisms is also provided at a position on an opposite face with respect to the entrance-side prisms; and the exit-side prism on the opposite face with respect to the entrance-side prisms includes the first, second, and third faces.

7. The image display apparatus according to claim 5, wherein the third face is a rough face.

8. A Fresnel lens sheet for use with a transmissive screen onto which light is projected from an image generation source, said lens sheet comprising:
a plurality of entrance-side prisms each formed at the image generation source side; and
a plurality of exit-side prisms each formed at the image-watching side;
wherein:
said plurality of entrance-side prisms are each formed in the region where the light enters at an angle equal to or greater than a desired incident angle, at the image generation source side of said Fresnel lens sheet, and include an incident face at which the light enters, and a reflective face that reflects the light entering from the incident face and makes the light exit toward the image-watching side;
said plurality of exit-side prisms are each formed in the range including a region of an opposite face with respect to a region in which said plurality of entrance-side prisms are not formed, at the image-watching side of said Fresnel lens sheet; and
at least one of said plurality of exit-side prisms includes a first face inclining toward a central side of said Fresnel lens sheet with respect to a line orthogonal to a principal plane thereof, refracting the light and making it exit toward the image-watching side, a second face approximately parallel to the principal plane of said Fresnel lens sheet, and a third face approximately vertical to the principal plane of said Fresnel lens sheet, said second face being formed at an end of the image-watching side of said at least one of said plural exit-side prisms.

9. The Fresnel lens sheet according to claim 8, wherein: at least one of said plurality of exit-side prisms is also provided at a position on an opposite face with respect to said entrance-side prisms; and said exit-side prism on the opposite face with respect to said entrance-side prisms includes the first, second, and third faces.

10. The Fresnel lens sheet according to claim 8, wherein the third face is a rough face.

11. The Fresnel lens sheet according to claim 8, wherein a height of a valley of each of said entrance-side prisms and a height of a section at which said entrance-side prisms are not formed are made approximately equal to each other; and a height of a valley of each of said exit-side prisms and a height of a section at which said exit-side refractive prisms are not formed are made approximately equal to each other.

12. The Fresnel lens sheet according to claim 8, wherein, on a transparent base material that constitutes said Fresnel lens sheet, said entrance-side prisms and said exit-side prisms are formed using ultraviolet-cured resin.

13. The Fresnel lens sheet according to claim 12, wherein a light-diffusing material is mixed with the ultraviolet-cured resin used to form said exit-side prisms, and/or with the ultraviolet-cured resin used to form said entrance-side prisms.

14. A screen onto which light is projected from an image generation source, said screen comprising:
a Fresnel lens sheet including a plurality of totally reflective prisms each formed at the image generation source side, and a plurality of refractive prisms each formed at the image-watching side; and
a diffusing sheet disposed at the image-watching side of said Fresnel lens sheet, said diffusing sheet diffusing image light at least in a horizontal direction of said screen;

wherein said plurality of totally reflective prisms are each formed in the region where the light enters at an angle equal to or greater than a desired incident angle, at the image generation source side of the Fresnel lens sheet, and include an incident face at which the light enters, and a totally reflective face that reflects the light entering from the incident face and makes the light exit toward the image-watching side;

said plurality of refractive prisms am each formed in the range including a region of an opposite face with respect to a region in which said totally reflective prisms are not formed, at the image-watching side of said Fresnel lens sheet and include a refractive face for refracting the light and making it exit toward the image-watching side; and at least one of said plurality of refractive prisms includes a first face inclining toward a central side of said Fresnel lens sheet with respect to a line orthogonal to a principal plane thereof, refracting the light and making it exit toward the image-watching side, a second face approximately parallel to the principal plane of said Fresnel lens sheet, and a third face approximately vertical to the principal plane of said Fresnel lens sheet the second face being formed at an end of the image-watching side of said at least one of said plurality of refractive prisms.

* * * * *